Nov. 7, 1950     F. V. COLLINS     2,528,722
POWER-DISTRIBUTION SYSTEM
Filed Oct. 28, 1948
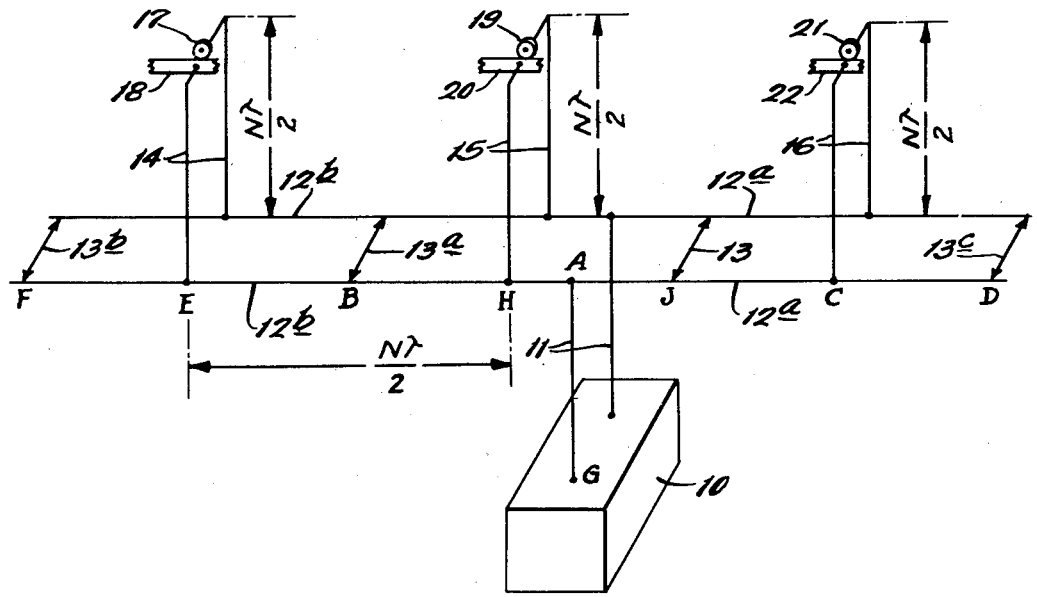
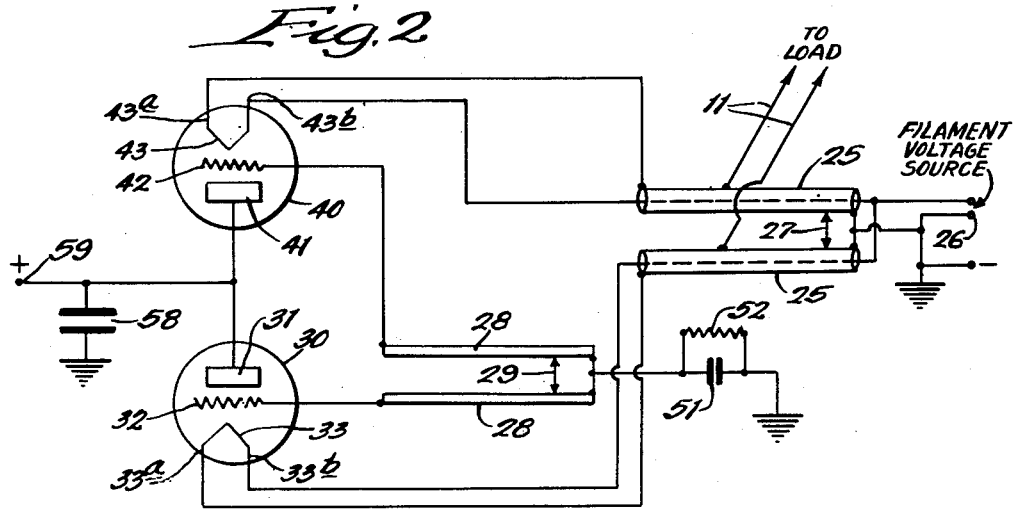
Inventor:
Fred V. Collins,
By Dawson, Ooms, Birth and Hagenberg,
Attorneys.

Patented Nov. 7, 1950

2,528,722

UNITED STATES PATENT OFFICE 2,528,722

POWER-DISTRIBUTION SYSTEM

Fred V. Collins, Des Plaines, Ill., assignor to William F. Stahl, Kenilworth, Ill.

Application October 28, 1948, Serial No. 57,029

4 Claims. (Cl. 219—47)

This invention relates to the distribution of radio-frequency energy from a single generator to a plurality of loads. In particular, it provides a power-distribution system for radio-frequency energy in which all or any selected part of a plurality of load devices may be employed at will without requiring re-tuning of the radio-frequency generator.

In numerous commercial applications of radio-frequency energy, and particularly in the use of radio-frequency energy in the heat-sealing of plastics, it is frequently desirable to operate a plurality of load devices from a single generator. In the plastic-sealing art, for example, a single manufacturing installation may have a substantial number of identical machines in simultaneous operation, in each of which a supply of plastic stock is formed into a desired shape and then sealed along its seams by applying to the plastic seam a very strong radio-frequency electric field. The energy dissipated in the plastic as a result of dielectric losses causes its temperature to rise beyond the fusion temperature, and as a result the separate plastic pieces are joined or bonded into a single piece.

Usually it is most economical in the operation of such an installation to provide a single radio-frequency generator having sufficient power to operate all the sealing machines, rather than to provide each machine with an individual generator. When a plurality of sealing machines are operated from a single radio-frequency generator, however, use at will of one or any desired group of the sealing machines has been inconvenient, for the reason that the addition or removal of a particular sealing machine to the load circuit has resulted in de-tuning of the radio-frequency generator. This has required that the generator be readjusted any time any alteration in the load circuit has been made.

The generator usually used for plastic sealing is a vacuum tube oscillator designed to generate radio-frequency energy having a frequency of 200 megacycles or more. Such oscillators normally use transmission line sections as tuning elements, and adjustment of such lines is normally accomplished by moving a shorting bar which is clamped between the two transmission line conductors. Thus readjustment of the oscillator, when necessary, requires the expenditure of considerable time and effort, and also requires that the oscillator be turned off during the readjustment operation.

In this invention I have provided a transmission circuit which will permit the use freely of one, all, or any desired group of load devices without causing any substantial de-tuning of the radio-frequency generator. Accordingly, in the use of my invention, the oscillator can be allowed to run continuously and the removal from service or addition of a particular sealing machine does not affect the operation of the others.

An object of this invention is to provide a power-distribution system connecting a radio-frequency generator to a plurality of load devices wherein particular load devices may be placed in service or removed therefrom without materially affecting the operation of the others.

Another object of this invention is to provide a power-distribution system in which the nature of the impedance presented by the load circuit is substantially unaffected by the number of load devices which may be in operation at a given time.

Other objects and advantages of my invention will appear as the specification proceeds.

The typical embodiment of my invention, as applied to a plurality of plastic-sealing machines, is illustrated in the appended drawings, of which Figure 1 is a diagrammatic view of a power-distribution system adapted to operate three plastic-sealing machines from a single radio-frequency generator; and Fig. 2 is a schematic diagram of an illustrative high-frequency oscillator of a sort commonly used as a radio-frequency generator in systems similar to that shown in Fig. 1.

In order to make clear the characteristics of the generator, and the resulting problems which must be solved in designing a distribution system for it, I shall first refer to Fig. 2 and describe the generator therein shown.

A pair of vacuum tubes 30 and 40 are shown connected in a tuned-grid, tuned-cathode circuit. Plate 41 of tube 40 and plate 31 of tube 30 are connected together and in turn are connected to the positive terminal of a direct-current source 59. The negative terminal of source 59 is grounded. Plates 31 and 41 are grounded for radio-frequency currents through by-pass condenser 58.

A transmission line section 28, which may consist of a pair of parallel metal tubes, serves as the grid tank circuit. One end of one of the tubes 28 is connected to grid 32 in vacuum tube 30; the corresponding end of the other tube 28 is connected to grid 42 in vacuum tube 40. The opposite ends of the tubes 28 are connected together and are connected to ground through grid condenser 51. A gridleak 52 is shunted across condenser 51. A variable shorting bar 29 is provided for adjusting the effective length of the transmission line section 28.

The cathode tank circuit 25 may also consist of a pair of parallel metal tubes. One end of one of the tubes 25 is connected to terminal 33a of the filament 33 of vacuum tube 30. The corresponding end of the other tube 25 is connected to terminal 43a of the filament 43 of vacuum tube 40. The opposite ends of the tubes 25 are connected together and are grounded. One side of filament-voltage source 26 is connected to ground and the other side of voltage source 26 is connected respectively to filament terminals 33b and 43b of the vacuum tubes 30 and 40. The lead connecting voltage source 26 with filament terminal 33b passes through the center of the tube 25 which is connected to filament terminal 33a. Similarly, the lead to filament terminal 43b passes from voltage source 26 through the tube 25 which is connected to filament terminal 43a. A shorting bar 27 is provided to permit variation of the effective length of the transmission line section 25, which tunes the cathode circuit. A transmission line 11 is tapped onto cathode tank circuit 25 at a suitable point intermediate its ends.

It is characteristic of an oscillator of the type just described that it presents a relatively low internal impedance, as viewed from the load circuit, and as a result it will, when once tuned properly, continue to operate efficiently over a wide range of effective load resistance. Likewise, the oscillator will not become seriously de-tuned due to changes in load reactance so long as such changes are not extreme and particularly so long as the load reactance does not change its sign from positive to negative or vice versa. Stated differently, if the oscillator is once adjusted for operating into a load circuit which is a combination of capacitance and resistance, it will operate effectively over a considerable range of variation in the load, so long as the load reactance does not become inductive.

Turning now to Fig. 1, it will be seen that the oscillator of Fig. 2 is therein shown diagrammatically in a cabinet denoted 10. The transmission line 11 leaves the generator 10 and proceeds to a T-junction which is denoted A on the figure. From point A the transmission line proceeds in separate forks, one branch, 12a, terminating in an adjustable shorting bar 13c. A branch line 16 leaves line 12a at point C and runs to the radio-frequency electrodes of a plastic-sealing machine. These electrodes comprise a roller or electronic foot 21 and a mandrel 22. The opposite branch 12b which leaves T-junction A is terminated in an adjustable shorting bar 13b. Transmission line 14 branches off from line 12b at point E and runs to a load device comprising electronic foot 17 and mandrel 18. Another branch line 15 leaves line 12b at point H and runs to a load circuit comprising electronic foot 19 and mandrel 20. Between points E and H an adjustable shorting bar 13a bridges line 12b. The point at which shorting bar 13a is connected to line 12b is denoted B. Another shorting bar 13 bridges line 12a at a point intermediate T-junction A and the point C at which branch line 16 is connected to line 12a.

It has been found that by appropriate adjustment of the shorting bars 13, 13a, 13b, and 13c a setting may be found at which the impedance reflected into generator 10 at point G has a reactive component of the same sign regardless of whether one or all of the load devices are actually engaged in sealing plastics.

When no plastic is passing between the electronic foot and the mandrel of the plastic-sealing machine the transmission line connected to them is terminated in a relatively high capacitive reactance, resulting from the capacitance between the electronic foot and the mandrel. This terminating impedance has practically no resistive component and is an approximation of an open circuit. When plastic material is placed between the electronic foot and the mandrel, the losses which result in heating of the plastic cause the introduction of a substantial resistive component in the impedance "seen" by the line at its termination. The reactance seen by the line is still capacitive, although its value is reduced in magnitude because the dielectric constant of the plastic is substantially greater than that of air. Moreover, the distance separating the electronic foot and the mandrel when the machine actively sealing plastic is normally less than the distance separating them when the foot is not in use and is hence in a retracted position.

The physical length of the branch transmission lines 14, 15, and 16 should be chosen so as to be approximately equal to an integral number of half-wavelengths. This length in feet or inches will of course depend on the frequency being used. Likewise, the distance separating the points E and H and the points H and C should be approximately equal to an integral number of half-wavelengths. The distance from A to H should also be approximately a half-wavelength or some integral multiple thereof.

The shorting bars 13 and 13a are placed at points substantially an odd number of quarter-wavelengths from the T-junction A. The same is true of shorting bars 13b and 13c at the terminals respectively of lines 12b and 12a.

When all the sealing machines are out of operation, the line segments which lie beyond the shorting bars 13 and 13a comprise high-Q resonant loops, and substantially no energy is drawn from the generator. As a result, the impedance "seen" by the generator is a capacitive reactance with practically no resistive component. As one or more of the sealing machines are placed in service, the resistive component of impedance seen by the generator becomes a more important factor in the overall impedance, and energy is accordingly drawn from the generator. The retive component of impedance, however, remains at all times capacitive, and its magnitude does not change sufficiently to cause appreciable de-tuning of the oscillator 10.

In a practical embodiment of my invention, the dimensions herein specified with respect to the positions of the various shorting bars are approximate only, and their adjustment for optimum results should be done by experiment, using the dimensions given as reference points to determine the approximate settings. I have found that excellent results can be obtained with the transmission circuit herein described with as many as six load circuits in service. When a greater number of load devices than three is employed, the lines 12a and 12b should be appropriately extended, and the necessary branch lines added to supply the additional load service. An adjustable shorting bar, similar to bar 13, should be provided to bridge the main line between each pair of branch transmission lines, and each end of the main line should be terminated in an adjustable bar as shown in the figure.

The terms "wavelength," "half-wavelength," and "quarter-wavelength," as used in the specification and claims herein, refer to a physical length which may be determined for any given installation of my invention by referring to the wavelength of the current being provided by the generator. When the frequency of the generated current is known, the wavelength in meters can be approximately determined by the well-known formula:

Wavelength (in meters) equals $$\frac{300}{\text{Frequency (in megacycles)}}$$

While I have described herein for purposes of illustration a particular embodiment of my invention in considerable detail, it will be understood that variations therein matters of detail may be made by those skilled in the art without departing from the spirit of my invention.

I claim:

1. A transmission system adapted to distribute high-frequency electrical energy from a generator to a plurality of load devices comprising a main two-conductor line, means for connecting the same to the generator, a branch line for each load device, each connecting a load device to the main line at spaced intervals along its length, said spaced intervals and the length of said branch lines being each substantially equal to an integral number of half-wavelengths at the operating frequency, and a plurality of adjustable shorting bars bridging the main line, one of said shorting bars being interposed between each pair of branch lines.

2. A transmission system adapted to distribute high-frequency electrical energy from a generator to a plurality of load devices comprising a main two-conductor line, a branch line for connecting the generator to the main line at an intermediate point thereof, a branch line for each load device, each connecting a load device to the main line at spaced intervals along its length, said spaced intervals and the length of said branch lines being each substantially equal to an integral number of half-wavelengths at the operating frequency, and a plurality of adjustable shorting bars bridging the main line, one of said shorting bars being interposed between each pair of branch lines.

3. A transmission system according to claim 1 which has a shorting bar bridging the main line near its terminal and beyond the branch line furthest from the generator, the distance from said shorting bar to said branch line being substantially equal to an odd number of quarter-wavelengths at the operating frequency.

4. In a system for distributing radio-frequency energy to a plurality of plastic-sealing machines, a radio-frequency generator, a main two-conductor line, means for connecting the same to the generator, a plurality of pairs of sealing electrodes, a branch line for each pair of electrodes connecting the same to the main line at spaced intervals along its length, the length of said branch lines and of said spaced intervals being substantially equal to an integral number of half-wavelengths at the operating frequency, and a plurality of adjustable shorting bars bridging the main line, one of said shorting bars being interposed between each pair of branch lines.

FRED V. COLLINS.

No references cited.